United States Patent [19]
Totterdell et al.

[11] Patent Number: 5,365,789
[45] Date of Patent: Nov. 22, 1994

[54] PRESSURE TRANSDUCERS WITH DIAMOND DIAPHRAGMS AND OPTICAL DEFLECTION DETECTION MEANS

[75] Inventors: David H. J. Totterdell; Paul R. Chalker, both of Didcot, Great Britain

[73] Assignee: United Kingdom Atomic Energy Authority, Didcot, England

[21] Appl. No.: 87,325

[22] Filed: Jul. 8, 1993

[30] Foreign Application Priority Data

Jul. 8, 1992 [GB] United Kingdom ............. 9214479.9

[51] Int. Cl.$^5$ ............................ G01L 9/06; G01L 9/00
[52] U.S. Cl. ........................................ 73/721; 73/705
[58] Field of Search ..................... 73/721, 727; 338/4; 427/34; 29/580; 73/705; 250/231.19; 92/103.5 D

[56] References Cited

U.S. PATENT DOCUMENTS

| | | | |
|---|---|---|---|
| 4,003,127 | 1/1977 | Jaffe et al. | 29/580 |
| 4,204,185 | 5/1980 | Kurtz et al. | 338/4 |
| 4,510,671 | 4/1985 | Kurtz et al. | 338/4 |
| 4,987,002 | 1/1991 | Sakamoto et al. | 427/34 |

FOREIGN PATENT DOCUMENTS

| | | |
|---|---|---|
| 0417512 | 3/1991 | European Pat. Off. |
| 0919360 | 11/1991 | South Africa . |
| 2208715 | 4/1989 | United Kingdom . |
| 2248111 | 3/1992 | United Kingdom . |
| 91/9360 | 7/1992 | United Kingdom . |

OTHER PUBLICATIONS

Journal Of The Electrochemical Society, vol. 137, No. 10, Oct. 1990, Manchester, N.H., pp. 3206–3210, J. L. Davidson, R. Ramesham, and C. Ellis, "Synthetic Diamond Micromechanical Membranes, Cantilever Beams, and Bridges."

Advances In Instrumentation, vol. 41, No. 3, 1986, Research Triangle Park, NC., pp. 1151–1158, K. L. Belsley, D. R. Huber, and J. Goodman, "All–Passive Interferometric Fiber–Optic Pressure Sensor."

Patent Abstracts Of Japan, vol. 15, No. 220 (p. 1211) 5 Jun 1991, & JP-A-30 63 538 (Idemitsu Petrochem Co. Ltd.) 19 Mar. 1991.

Database WPI, Week 9307, Derwent Publications Ltd., London, GB; AN 93-059105 & ZA-A-9 109 360 (De Beers Ind. Diamond Div. Pty. Ltd.) 30 Sep. 1992.

Peter Bachmann, "Diamonds from the Vapour Phase," Physics World, Apr. 1991, pp. 32–36.

Brian Culshaw, "Optical Systems and Sensors for Measurement and Control," J. Phys. E: Sci. Instrum., vol. 16, pp. 978–986, 1983.

Christopher M. Lawson and V. J. Tekippe, "Fiber-Optic Diaphragm-Curvature Pressure Transducer", Optics Letters, vol. 8, No. 5, May, 1993, pp. 286–288.

Thor-Erik Hansen, "A Fiberoptic Micro-Tip Pressure Transducer for Medical Applications," Sensors And Actuators, 4 (1983) pp. 545–554.

*Primary Examiner*—Richard E. Chilcot, Jr.
*Assistant Examiner*—William L. Oen
*Attorney, Agent, or Firm*—William R. Hinds

[57] ABSTRACT

A pressure transducer comprises a polycrystalline diamond diaphragm (39), produced by use of a chemical vapour deposition technique, on a support (33). The diaphragm (39) can deflect in response to variations in pressure. A single optical fibre interferometer (36, 32) is used for detecting and measuring the deflection of the diaphragm (39) (FIG. 3).

5 Claims, 2 Drawing Sheets

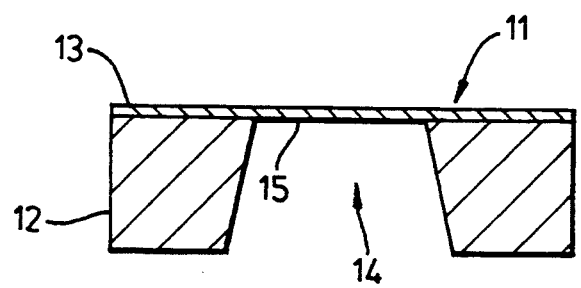
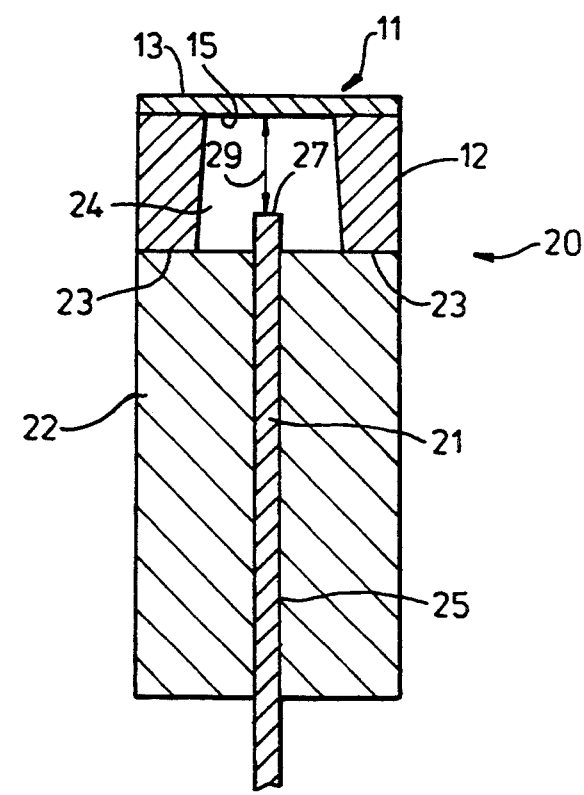
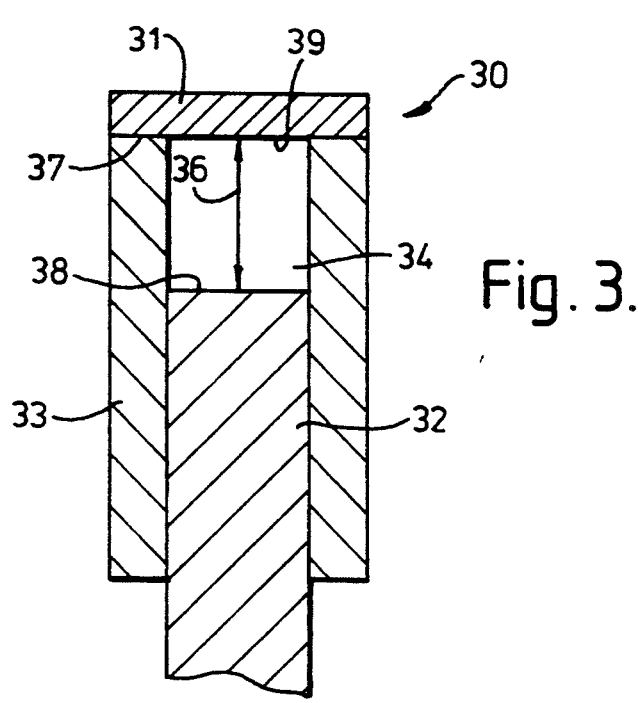

PRESSURE TRANSDUCERS WITH DIAMOND DIAPHRAGMS AND OPTICAL DEFLECTION DETECTION MEANS

The present invention relates to transducers and more particularly to pressure transducers.

According to the present invention, there is provided a pressure transducer which comprises a polycrystalline diamond diaphragm produced by vapor deposition of diamond onto a substrate and subsequent removal of the substrate to expose a rear surface of the diaphragm, means supporting the diaphragm such that the diaphragm can deflect in response to variations in pressure, and means to detect such deflection, the means to detect deflection comprising means for causing light to be incident on the rear surface of the diaphragm, and means for detecting light reflected by the rear surface of the diaphragm and thereby to detect deflection of the diaphragm.

A method of manufacture of a diaphragm assembly suitable for use in a pressure transducer in accordance with the invention may comprise preparing a suitable substrate and depositing a polycrystalline diamond film thereon by chemical vapour deposition (CVD), the preparation and deposition being performed such that there is a high density of nucleation sites present during the deposition process, and then removing unwanted substrate material to expose selected regions of the polycrystalline film to form a diaphragm.

Suitable substrates for use in the invention include silicon and diamond; tungsten, tantalum and other materials might also be used if pretreated so as to enable heteroepitaxy to occur.

If desired all of the substrate may be removed, after deposition of the polycrystalline diamond, to produce a free-standing unsupported polycrystalline diamond film which may then be bonded to a suitable support member to form a diaphragm. The diamond film may be bonded to the support member by any suitable means such as by use of an adhesive e.g. a cyanoacrylate adhesive or by thermal bonding. Alternatively the substrate may be partially removed, and the diaphragm assembly may be bonded to a support member by thermal fusion of the substrate to the support member or by use of an adhesive e.g. cyanoacrylate adhesive. In either case the support member may be of quartz.

In each case the support member is preferably designed such that an optical fibre may be located within it and in a predetermined location in relation to the polycrystalline diamond diaphragm, so that an optical interferometer may be linked to the optical fibre and used to measure any deflection of the diamond diaphragm. The optical fibre may be retained within the support member by use of a suitable adhesive e.g. cyanoacrylate adhesive. When the substrate is partially removed the optical fibre may be bonded to the substrate rather than or in addition to the support member.

The combination of a diaphragm assembly produced by partial removal of the substrate or a free standing diaphragm, with a support member and an optical fibre, may be referred to as a pressure transducer head.

In order to generate nucleation sites the substrate may be treated before the deposition of polycrystalline diamond; these nucleation sites assist in the deposition process. Suitable surface preparation or treatment techniques include surface toughening by polishing with 1 micrometer diamond powder polishing paste.

The polycrystalline diamond film is deposited onto the substrate by chemical vapour deposition; the chemical precursors to the polycrystalline diamond are held in or injected into a chamber in gaseous form and induced, usually by thermal activation using a hot wire or filament, to deposit as a diamond film on a substrate which is held in the chamber. Plasma activated chemical vapour deposition or microwave activated chemical vapour deposition may be used. When microwave activated chemical vapour deposition is used the need for nucleation sites produced by surface treatment is greatly reduced. It is believed that microwave activation of chemical vapour deposition results in a higher degree of supersaturation of reactive precursors which results in high nucleation densities during deposition.

The polycrystalline diamond film can be deposited in such a way as to have elastic properties substantially equal to those of diamond with low internal stresses such as compressive or tensile stresses and to exhibit low interfacial porosity between itself and the substrate. Elastic properties of the film allow it to be used in a pressure transducer. Low internal stresses ensure that the film does not deform, remaining coherent and flat. Low interfacial porosity prevents delamination of the polycrystalline film from the substrate and thus improves adhesion between the two.

When the deposition method utilises a hot wire or filament it is preferred that the hot wire or filament is tantalum at a temperature above 1800° C. and more preferably about 2000 ° C. It is also preferred that the chemical precursors comprise a gaseous mixture including hydrocarbon and hydrogen. Preferably the hydrocarbon is an alkane such as methane. This mixture may be introduced into the chemical vapour deposition apparatus at a pressure of $5 \times 10^3$ Pa and at a flow rate of 20-500 cm$^3$min$^{-1}$ and preferably at a flow rate of 80-120 cm$^3$min$^{-1}$ and most preferably at a flow rate of 100 cm$^3$min$^{-1}$. The pressure within the chemical vapour deposition apparatus is preferably maintained at a pressure of approximately $5 \times 10^3$ Pa.

The hydrocarbon is present in the mixture at less than 1% by volume preferably at 0.3–0.9% by volume and most preferably at 0.5% by volume. The hydrogen present in the mixture is in one respect acting as a carrier for the hydrocarbon. It is believed that it also assists in the deposition of the polyclystalline diamond film by stabilizing its surface and removing any graphitic deposits.

During deposition the substrate is preferably maintained at a temperature of between 700°–1000° C. and more preferably between 750°–850° C.

The above parameters may be varied independently of each other in order to control the properties of the deposited polycrystalline diamond film and its rate of deposition. Rates of deposition as high as 100 $\mu$m hr$^{-1}$ may be achieved with chemical vapour deposition, but at deposition rates as high as this polycrystalline diamond films with poor mechanical properties are deposited and are generally unsuitable. It is preferred that the deposition rate is low such as less than 10 $\mu$m hr$^{-1}$ and preferably less than 1 $\mu$m hr$^{-1}$ and most preferably between 0.1 and 0.3 $\mu$m hr$^{-1}$. Low deposition rates produce polycrystalline diamond films which have low internal stresses.

The polycrystalline diamond film may have a thickness of up to 30 $\mu$m and preferably between 10–15 $\mu$m. However films with a thickness as low as 2 $\mu$m can be deposited.

The removal of unwanted substrate may be achieved by any suitable means and is dependent on the substrate which is used. Where silicon is used as the substrate etching using conventional masking and conventional silicon etching techniques may be used.

A pressure transducer incorporating a diamond diaphragm may be used for measuring pressure changes in high temperature or chemically hostile environments, or even for in-vivo pressure measurement. When used to measure pressure changes in-vivo the pressure transducer would preferably have a response range of 0–30 kPa and most preferably 0–26 kPa.

The invention will now be described by way of example only, with reference to the accompanying drawings in which:

FIG. 1 shows a schematic representation of a diaphragm assembly suitable for use in a pressure transducer;

FIG. 2 shows a schematic representation of a pressure transducer head comprising the assembly of FIG. 1, a support and an optical fibre;

FIG. 3 shows a schematic representation of a pressure transducer head comprising a polycrystalline diamond film, a quartz tube support and an optical fibre;

Figure 4:
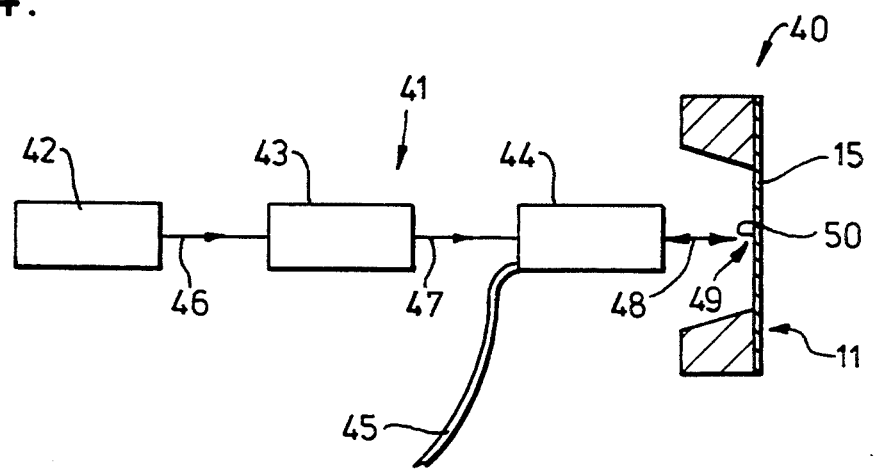
FIG. 4 shows a schematic representation of a pressure transducer comprising a pressure transducer head with the assembly of FIG. 1 and a single fibre interferometer.

Referring to FIG. 1 an assembly 11 includes a substrate 12 which acts as a support for a polycrystalline diamond film 13 of thickness 15 microns. In the substrate 12 is a microcavity 14 of diameter about 1 mm bounded by part of the film 13; this part of the film 13 defines a polycrystalline diamond diaphragm 15 which is supported by the substrate 12.

Referring now to FIG. 2 there is shown a pressure transducer head 20 comprising the assembly 11 of FIG. 1 an optical fibre 21 which is coupled to a single fibre interferometer (shown in FIG. 4), and a support 22 for the assembly 11 and optical fibre 21. The assembly 11 is bonded to the support 22, which is a quartz tube, at interface 23, so that the microcavity 14 of assembly 11 and the support 22 together define a compartment 24 within the pressure transducer head 20. The optical fibre 21 locates inside the bore 25 of the support 22, in which it is a sliding fit. Between the end-face 27 of the optical fibre 21 and the underside of the diaphragm 15 is a gap 29. The magnitude of gap 29 may be controlled by adjusting, during assembly the position of the optical fibre end-face 27 within the compartment 24. The optical fibre 21 is bonded to the support 22 within the bore 25 when the desired magnitude of gap 29 is achieved.

Referring now to FIG. 3 there is shown a pressure transducer head 30 comprising a polycrystalline diamond film 31 an optical fibre 32 and a support 33. The diamond film 31 is bonded to the support 33 at interface 37. The support 33 is a quartz tube with a bore of 0.7 mm which on bonding the diamond film 31 to the support 33, and insertion of the optical fibre 32 into the bore of the support 33 defines a compartment 34 within the pressure transducer head 30; the portion of the film 31 which is adjacent the compartment 34 acts as a diaphragm 39. The optical fibre 32 is located within the bore of the support 33. The position of the optical fibre 32 and its end face 38 can be adjusted, in an analogous manner to that described for optical fibre 21 above and its end-face 27, in order to provide a gap 36 of a desired width.

Referring now to FIG. 4 there is shown a schematic representation of a pressure transducer 40 comprising the assembly 11 of FIG. 1 in conjunction with a single fibre interferometer 41. The single fibre interferometer 41 comprises a laser source 42, a laser to optical fibre coupler 43, a 50/50 coupler 44 which is connected to a detector system via lead 45, optical fibres 46, 47 and 48 and a gap 49 (equivalent to the gap 29 or 36).

The pressure transducer 40 illustrated in FIG. 4 operates in the following manner. The laser source 42 produces laser radiation which is emitted via the optical fibre 46 and enters the optical fibre coupler 43. The radiation exits the optical fibre coupler 43 via optical fibre 47 and enters the 50/50 coupler 44. The radiation exits from the 50/50 coupler 44 via optical fibre 48 Laser radiation is emitted from optical fibre 48 across the gap 49 and is incident upon diaphragm 15 at point 50 after traversing the gap 49. The laser radiation is then reflected back to and into optical fibre 48, after re-traversing gap 49. The reflected radiation enters the 50/50 coupler 44 via optical fibre 48. The 50/50 coupler 44 produces a signal resulting from the coupling of the incident and reflected light which is detected, via lead 45, by a suitable detector. When a pressure change acts upon the diaphragm 15 the gap 49 is either increased or decreased resulting in a phase change between the incident and reflected laser radiation which produces a change in the signal from the 50/50 coupler 44 to the detector via the lead 45. The magnitude of the change in signal from the 50/50 coupler 44 has a direct relationship to the magnitude of the pressure change acting upon the diaphragm 15. The sensitivity of the pressure transducer 40 depends on the thickness of the diaphragm 15, and its diameter.

The invention will now be further described by way of the following example:

Substrate Preparation

A silicon wafer substrate 170 $\mu$m thick was embedded in wax and its exposed surface was polished for 1 hour by mechanical polishing using a polishing lap with weighted armature and 1.0 $\mu$m diamond polishing paste. After polishing the silicon wafer substrate was released from the wax by melting. Residual wax was then removed from the substrate using a trichloroethylene rinse which was followed by an Analar methanol rinse. After degreasing using conventional techniques the substrate was ready for the deposition process.

Deposition of polycrystalline Diamond Film

The silicon wafer substrate as prepared above was introduced into the chamber of a Thermal Filament Chemical Vapour Deposition (TFCVD) apparatus and held approximately 7–10 mm beneath a tantalum filament. The chamber of the apparatus was evacuated down to a pressure of less than 8 Pa. Hydrogen 99.9% purity and methane 99.9% purity were then introduced to the chamber at the flow rates of 100 cm$^3$min$^{-1}$ and 0.5–0.8 cm$^3$min$^{-1}$ respectively such that the pressure within the deposition chamber was maintained at a pressure of approximately 5 kPa. The tantalum filament was heated to and maintained at a temperature of about 2000° C. The silicon wafer substrate was also heated (by an external furnace), and maintained at a temperature of about 850° C. Under these conditions polycrystalline diamond was deposited on the substrate. The deposition was continued for about 38 hours at a deposition rate of between 0.3–0.5 $\mu$m hr$^{-1}$ to produce a deposited polycrystalline diamond film of thickness between 5–10 $\mu$m.

Assembly of Pressure Transducer Head

After deposition of the polycrystalline diamond film was completed the silicon substrate was removed by chemical etching in KOH and isopropyl alcohol at 80° C. to produce a free standing polycrystalline diamond film. This film was bonded to the end of a quartz tube of internal diameter 0.7 mm, using conventional cyanoacrylate adhesive. Bonding of the film to the quartz tube defined a polycrystalline diamond diaphragm over the base of the tube. An optical fibre which was coupled to a single fibre interferometer was introduced into the quartz tube until the fibre end touched the polycrystalline diamond diaphragm attached to the end of the quartz tube. The fibre was then gradually withdrawn until the signal produced by the interferometer was optimised. When the signal was optimised the optical fibre was bonded to the quartz tube using a standard cyanoacrylate adhesive. The signal obtained indicated that the back surface of the diaphragm had adequate reflectivity for use with the single fibre interferometer and that it therefore did not require metallisation.

Use of the Pressure Transducer Head

Figure 5:
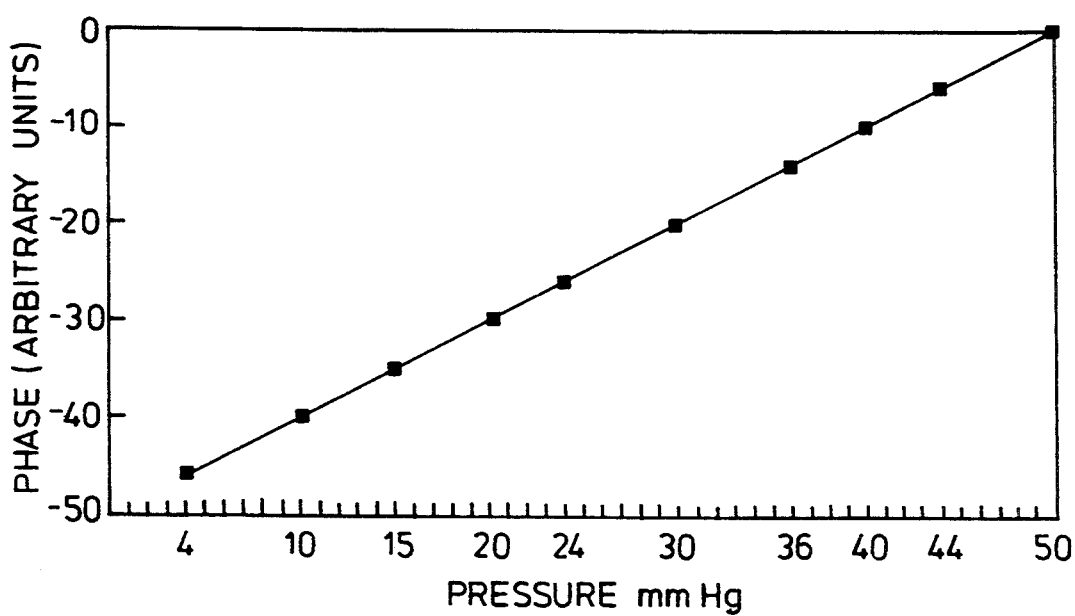
FIG. 5 shows graphically the variation of phase (measured in arbitary units) with pressure (mmHg) as determined using the pressure transducer head of FIG. 3.

The pressure transducer head as prepared above was sealed into one end off a glass vessel with the quartz tube protruding; into the other end was sealed a manometer for pressure measurement. The pressure vessel was pressurised to a pressure of 30 kPa and held at this pressure for 30 minutes. No loss of pressure was observed during this time indicating that the polycrystalline diamond was continuous, had no pin holes, and could withstand this operating pressure. The pressure within the pressure vessel was now varied between 0 and 26 kPa and the phase shift for the optical fibre interferometer was recorded. The data up to approximately 7 kPa (50 mmHg) is shown in FIG. 5. Pressures higher than 7 kPa could not be measured as the pressure transducer was too sensitive for these higher pressures. The zero pressure difference does not correspond to zero phase as no attempt was made to establish a proper calibration. The response was linear as illustrated by the data. Successive pressurising and depressurising of the diaphragm did not result in any failure indicating that the mechanical properties of the diaphragm were adequate for this application.

What is claimed is:

1. A pressure transducer which comprises a polycrystalline diamond diaphragm produced by vapor deposition of diamond onto a substrate and subsequent removal of the substrate to expose a rear surface of the diaphragm, means supporting the diaphragm such that the diaphragm can deflect in response to variations in pressure, and means to detect such deflection, said means to detect deflection comprising means for causing light to be incident on the rear surface of the diaphragm, and means for detecting light reflected by the rear surface of the diaphragm and thereby to detect deflection of the diaphragm.

2. A transducer as claimed in claim 1 wherein the substrate is selected from silicon, diamond, or a material which has been treated to enable heteroepitaxy to occur.

3. A transducer as claimed in claim 1 wherein the polycrystalline diamond diaphragm has a thickness of no more than 30 $\mu$m.

4. A transducer as claimed in claim 3 wherein the thickness is approximately 10–15 $\mu$m.

5. A transducer as claimed in claim 1 wherein the means to detect the deflection is a single fibre interferometer.

* * * * *